United States Patent [19]

Janes et al.

[11] 4,009,391

[45] Feb. 22, 1977

[54] SUPPRESSION OF UNWANTED LASING IN LASER ISOTOPE SEPARATION

[75] Inventors: George Sargent Janes, Lincoln; Richard H. Levy, Boston, both of Mass.; Lawrence A. Levin, Beer Sheva, Israel

[73] Assignee: Jersey Nuclear-Avco Isotopes, Inc., Bellevue, Wash.

[22] Filed: June 25, 1974

[21] Appl. No.: 482,866

[52] U.S. Cl. .............................. 250/281; 250/284; 250/423 P; 331/94.5 R

[51] Int. Cl.² ................... H01J 37/08; H01J 39/34

[58] Field of Search .......... 250/281, 282, 283, 284, 250/296, 423, 424, 423 P; 331/94.5

[56] References Cited
UNITED STATES PATENTS

| | | | |
|---|---|---|---|
| 3,417,345 | 12/1968 | Cabezas | 331/94.5 E |
| 3,443,087 | 5/1969 | Robieux | 250/426.5 |
| 3,772,519 | 11/1973 | Levy | 250/426.5 |

Primary Examiner—Craig E. Church
Attorney, Agent, or Firm—Weingarten, Maxham & Schurgin

[57] ABSTRACT

Frequency selective means, particularly for use in uranium enrichment by laser induced isotopically selective ionization to suppress unwanted lasing of the excited uranium medium. The frequency selective means, such as filters, are placed at intervals in a column of laser illuminated uranium vapor and are transmissive to the illuminating laser frequencies but nontransmissive to frequencies at which population inversions exist in the excited uranium. The filters limit the path length and correspondingly the gain in the excited uranium to prevent high intensity lasing by the uranium itself.

29 Claims, 5 Drawing Figures

SUPPRESSION OF UNWANTED LASING IN LASER ISOTOPE SEPARATION

FIELD OF THE INVENTION

The present invention relates to a system for laser excitation of a medium and particularly to a system for limiting the laser amplification of the medium.

BACKGROUND OF THE INVENTION

The effect known as lasing results from the generally simultaneous decay of excited particles in a medium. This simultaneous decay may be initially triggered by a noise generated decay of a few particles which is augmented or reinforced by amplification of the radiation as it travels through the medium. The amplification can reach large magnitude and thereby produce high intensity laser radiation if the optical path through the medium is long enough, and the corresponding gain very high. The gain associated with a uniformly excited medium is typically a constant factor per unit length up to a limiting factor. If reflective or partially reflective elements are associated with the excited medium, the self lasing radiation may be reflected through the same medium many times, being amplified on each pass, to achieve the same effect as a substantially greater length of the medium. In either case, the self lasing intensity increases with the amplification by the medium. When the intensity is sufficiently high, the traveling radiation will significantly depopulate the excited states of the particles in the medium through which it passes. At this point, gain is also limited by the number of available excited particles.

In the application of laser excitation to uranium enrichment (as shown in U.S. Pat. No. 3,772,519 and U.S. patent application Ser. No. 328,954, filed Feb. 2, 1973, incorporated herein by reference), as in many other applications, the loss of excited particles in the generation or amplification of self lasing radiation may significantly reduce the efficiency of the system. In addition, the self lasing radiation may have an intensity sufficient to be harmful in other ways to the system for laser excitation.

BRIEF SUMMARY OF THE INVENTION

The present invention provides a system for suppressing unwanted lasing in an excited column of particles to at least acceptably low intensity levels. In accordance with the preferred embodiment of the present invention, a system for laser enrichment, particularly of uranium, is disclosed in which the self lasing intensity of a long, laser illuminated column of uranium vapor is limited by the insertion of an optical filter or other frequency selective element at one or more points in the column to attenuate possible self lasing frequencies without significant absorption of the excitation laser energy.

In preferred apparatus for practicing the invention, a series of separation chambers are arranged along an optical path for excitation laser radiation. Each chamber contains a uranium vaporization source as well as a magnetohydrodynamic accelerator for separate collection of selectively ionized uranium particles. The excitation and, where applicable, ionization laser radiation enters and exits the chambers through optically transmissive windows. To limit the intensity of self lasing, filters or frequency selective elements are placed intermediate the chambers, separated from each other or form the laser sources by a distance which limits the lasing gain of the uranium vapor such that self lasing intensities are kept low enough to prevent substantial interference with the enrichment process. The filters are designed to be nearly fully transmissive at the frequencies of the exciting laser radiation and for this purpose may either be made highly attenuating at the specific frequencies where self lasing may occur, or, preferably, made to attenuate all frequencies other than the passbands of the exciting laser radiation. Filters for accomplishing this may typically be fabricated, for the preferred mode, from dispersive elements which split the laser radiation onto appropriate spectral lines which may then be passed through optical masks and further dispersive elements which recombine the radiation beam onto a combined coaxial beam again, assuming more than one frequency of laser radiation will typically be present.

The optically transmissive elements of the chambers and filters may typically have partially reflecting surfaces as in optical grade quartz. In such case, it is preferable to orient such surfaces at a nonorthogonal angle to the path of applied laser radiation to prevent reflection feedback which might increase the path gain through the uranium vapor so as to permit self lasing as in a cavity.

BRIEF DESCRIPTION OF THE DRAWING

These and other features of the present invention are fully set forth below in the detailed description of the preferred embodiment, and in the accompanying drawing of which.

DESCRIPTION OF THE PREFERRED EMBODIMENT

The present invention may be applied to control self lasing in any excited medium, but is particularly contemplated for use in a system for permitting production plant utilization of laser enrichment, such as uranium enrichment, by limiting self lasing of the enrichment medium. For production scale utilization, the enrichment medium is illuminated in a long column by a beam of exciting laser radiation. The column of irradiated material is typically, though not necessarily, a vapor phase material containing particles in either atomic or molecular form. Filter means providing a frequency selective transmission or reflection, are interposed in specific locations in the column of laser radiation to suppress the frequencies at which self lasing may occur.

Figure 1:
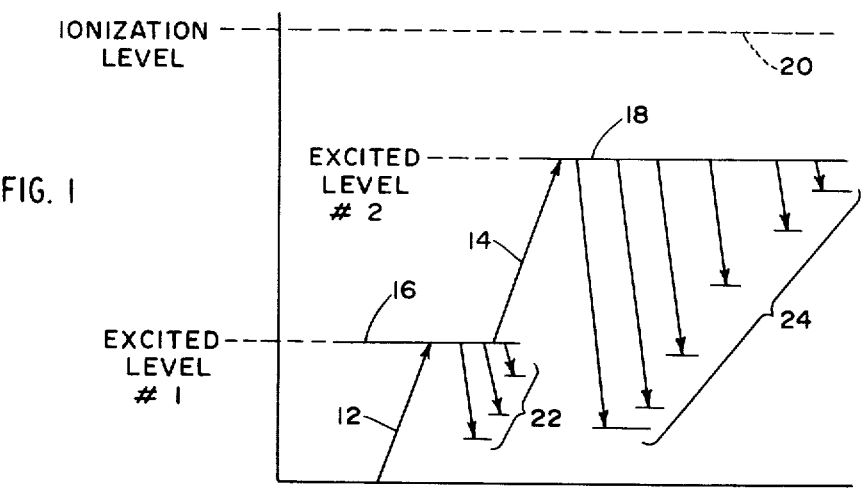
FIG. 1 is an energy level diagram illustrating the background of the present invention.

Reference now may be made to FIG. 1 which is an energy level diagram useful in explaining the background of physics for the present invention. As shown in FIG. 1, a typical laser enrichment scheme may employ first and second energy steps 12 and 14 to excite particles to respective energy levels 16 and 18. For this example, two frequencies of simultaneously pulsed laser radiation will be applied in a combined beam to a flowing vapor of the material, typically uranium, to be enriched. Each pulse of applied radiation has at least the laser frequency for the initial transition 12 narrowly limited in frequency in order to be isotopically selective, thus exciting one isotope such as U-235 without producing corresponding excitation of other isotope types in the uranium vapor. Accordingly, some of the U-235 atoms in the vapor will be elevated to the level 16, and some of those very rapidly elevated to the level 18. This process will continue during the pulse, reducing the U-235 in the lower state.

Typically, the level 18 is some specified energy difference below the ionization level 20. In the case of uranium, the ionization level 20 is understood to be approximately 6.2 electron volts (ev). The level 18 may be below the level 20 by an energy difference just below the photon energy of a further laser radiation used for ionization. It should be noted that the details of ionization are not significant to an understanding of the invention, nor is the specific manner by which excitation is achieved, one or more energy steps being possible. In all cases, there will, for the particles excited to the energy levels 16 and 18, exist a number of lower lying levels 22 for the level 16 and levels 24 for the level 18, for which a population inversion exists. This means that there will be more of the particles of the one isotope type, U-235, in the state 16 than in each of the lower states 22. Similarly, there will be more excited particles in the state 18 than in each of the lower lying states 24. This condition of population inversion permits self lasing by the uranium vapor in any one of the possible transitions between the levels 16 and 18 and lower lying levels to which the inversion exists. This lasing will be amplified to a high intensity if there is sufficient gain which can be provided either by reflective elements to feed back radiation into the excited vapor or by a sufficiently long column of the uranium vapor in an optically straight line. Factors which affect the gain for self lasing include the density of the medium, the degree of inversion and other atomic parameters.

In the production level uranium enrichment, it is contemplated to illuminate a substantially long column of uranium vapor in order to absorb as much of the laser radiation as possible for efficiency in system operation. It is thus contemplated that a path of optically straight irradiated uranium will exist in a production plant for which self lasing by the uranium vapor will occur. In such a case, the uncontrolled release of energy through self lasing can be of such intensity as to result in a loss of excited particles from the states 18 or 16 with corresponding reduction in the efficiency of the separation technique. Additionally, the self lasing may prove harmful to objects in the path of the laser beam and may contribute to a loss of isotopic selectivity in the enrichment technique.

Figure 2:
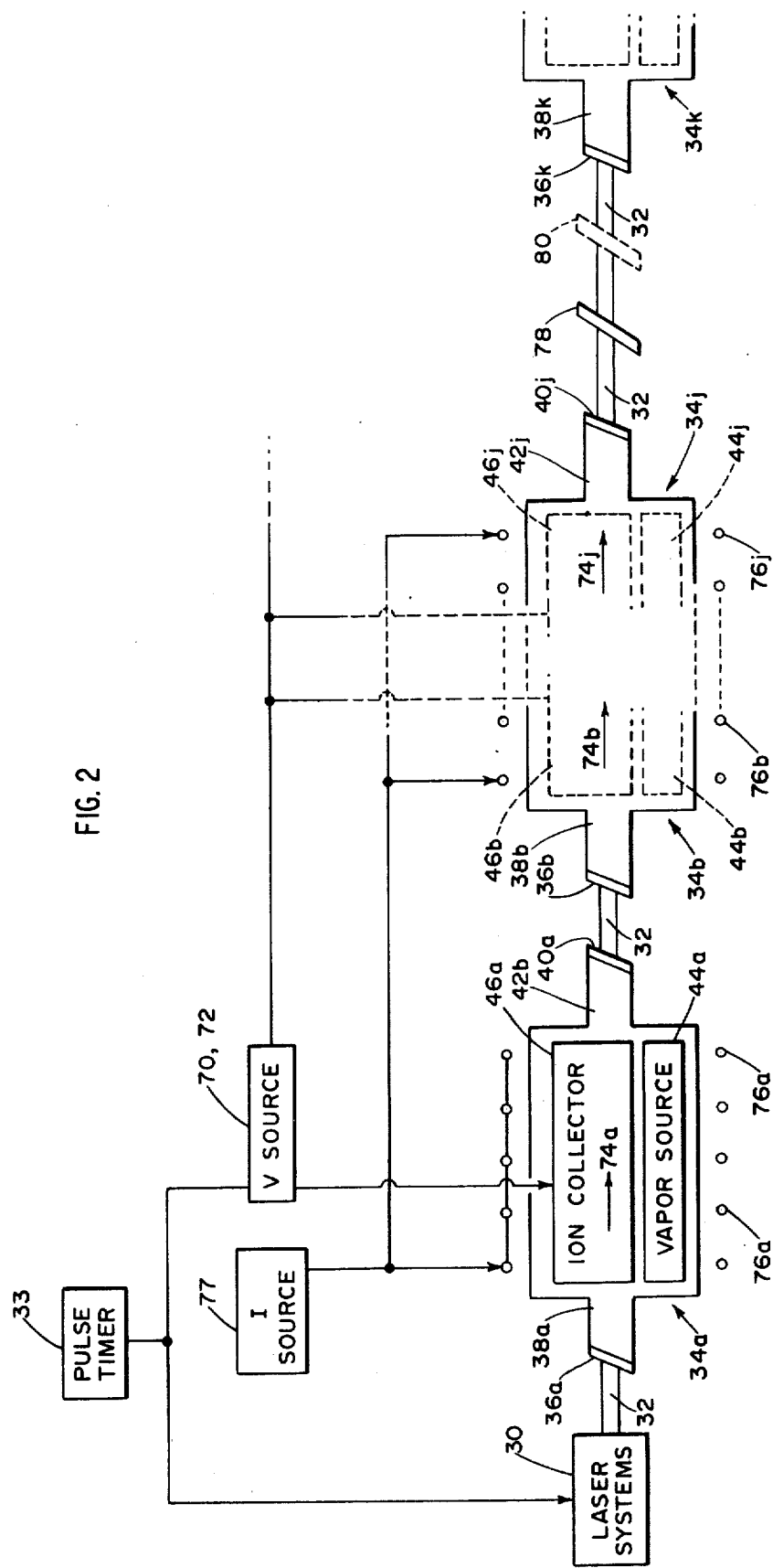
FIG. 2 is a system schematic diagram illustrating the apparatus according to the present invention.

In order to counteract this effect, apparatus according to the invention can be applied to a system for production level enrichment having a long column of illuminated uranium vapor as illustrated in FIG. 2. As shown there, laser systems 30 have an output beam 32 of laser radiation. The laser systems 30 may typically include two laser systems of the type described in the above-referenced patent and applications. These may include Dial-A-Line lasers of the Avco Everett Research Laboratory, Everett, Mass., and may typically operate in the red to orange portion of the visible spectrum. For the case of two lasers, each frequency would correspond to respective transitions 12 and 14 illustrated in FIG. 1. The frequency for the transition 12, at least, would be narrowly defined, using etalon or other filter elements, where necessary, to correspond to an absorption line for the desired, typically U-235, isotope but which would not encompass correspondingly an absorption line for other isotope types.

The beam of radiation 32 in this case is a composite beam of pulsed radiation. The radiation from the two lasers is combined through dispersive or other combining means and each pulse is triggered by a pulse timer 33. The beam 32 is applied to a sequence of chambers 34a, 34b . . 34j, 34k . . Each chamber such as chamber 34a comprises an input window 36a on an extension 38a to remove the window 36a from contaminating components of the chamber 34a. An exit window 40a is also provided on an extension 42a. Windows 34a and 40a are inclined at an oblique angle to the beam 32 to prevent reflections. Radiation exiting through the window 40a is subsequently applied through the input window 36b of the chamber 34b and on through further chambers for efficient utilization of energy in the laser beam 32.

Within each chamber 34a–34j, such as shown in chamber 34a, a uranium vapor source 44a is provided to direct a beam of uranium vapor into an ion collector 46a where the vapor is exposed to the radiation in the beam 32.

Figure 3:
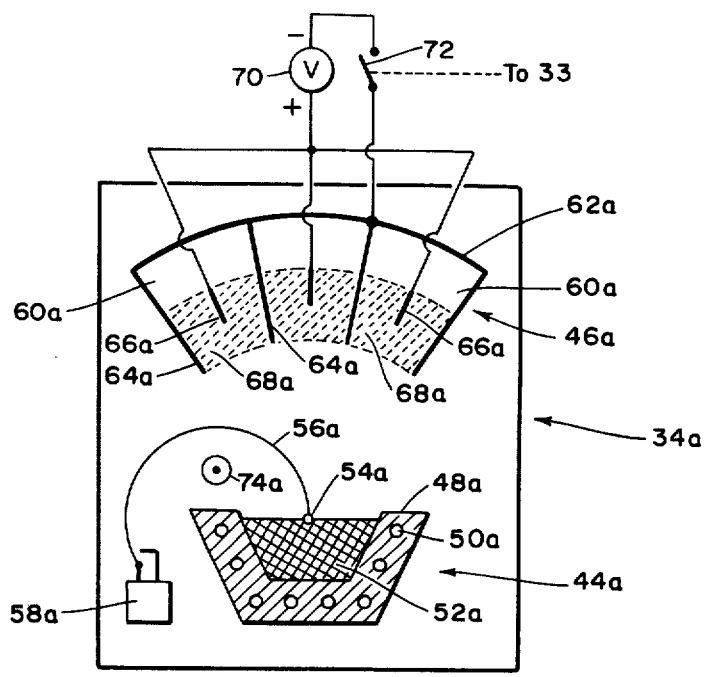
FIG. 3 illustrates an internal sectional view of a portion of the FIG. 2 apparatus.

As shown in FIG. 3, the vapor source 44a typically includes a crucible 48a having a plurality of cooling ports 50a and containing a mass 52a of uranium metal which is vaporized along a line 54a by impacting energy in an electron beam 56a from a filamentary electron beam source 58a. The expanding uranium vapor flow is directed toward the ion collector 46a which comprises a plurality of, for example, odd numbered, separation chambers 60a which are defined by conducting, rear cylindrical tails collection plate 62a and electrically connected side plates 64a. Within each chamber 60a, is a central electrode 66a. A region 68a toward the front of each chamber 60a is illuminated by the applied laser radiation, typically employing multiple reflections of the beam from one adjacent chamber to the next by reflecting prism or mirror means, not shown, but which may typically be placed outside of each chamber 34a–34j. The electrodes 66a are connected in common to the positive potential of a voltage source 70 which provides a voltage typically in the range of 10–100 volts. The electrically conducting structure consisting of plates 62a and 64a is also connected in common through a switch 72 which is controlled by the timer 33 for periodic application of a pulsed electric field within the chambers 60a directly subsequent to each pulse of laser radiation. The applied electric field pulse cooperates with a magnetic field 74a to produce magnetohydrodynamic acceleration on particles in the uranium vapor flow ionized by the laser radiation so as to collect them on one of the plates 64a. Magnetic field 74a is provided by a set of coils 76a surrounding the chamber 34a, and excited by D.C. current from a source 77 to produce a field of typically a few hundred gauss. Similar components are provided in the chambers 34b–34j. After a predetermined optical length of the path of radiation through the chambers 34a–34j including the path provided by multiple reflections through the regions 68a–68j, a filter 78 is placed in the path of radiation 32, or more particularly in the path that self lasing radiation from the uranium vapor within the chambers 34a–34j would take. The function of the filter 78 is to attenuate radiation in the path of beam 32 at frequencies at which self lasing of the uranium vapor could occur in accordance with the actual population inversions as exemplifed in FIG. 1. Such a filter may provide the attenuation by a reflective or absorptive function. In simplest form, filter 78 may be constructed of a single plate of obliquely inclined glass, quartz or other material and coated or not as needed. Filter 78 may provide either bandpass filtering of the one or more radiation frequencies in the applied laser radiation, or band elimination filtering of the unwanted self lasing frequencies. A plurality of serially arrayed individual filter elements 78 and 80 for example, may be provided for each of the possible frequencies for which an inversion may exist.

Figure 4:
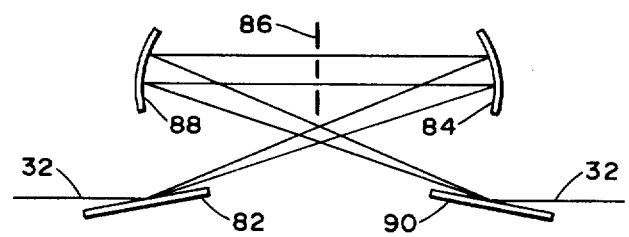
FIGS. 4–5 illustrate in detail filter concepts for use in the FIG. 2 embodiment.
Figure 5:
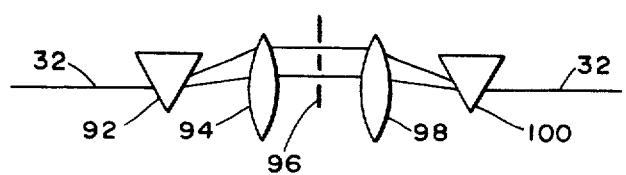

Preferably, the filter or filters are composed of elements which are generally nontransmissive to all frequencies except those specific bands in the radiation from laser systems 30 corresponding to the one or more transitions, such as transitions 12 and 14 shown in FIG. 1. For this purpose, convenient optical systems are shown in FIGS. 4 and 5 and include in FIG. 4 a dispersive element such as grating or prism 82 to separate the frequencies of radiation along the path of beam 32. The radiation in the separated spectrum is directed toward a cylindrical, concave reflector 84 which redirects the radiation onto parallel paths through a mask 86 which has aperture slits to pass only the frequencies corresponding to the applied radiation from the laser systems 30. The masked radiation is then reflected by a further cylindrical reflector 88 which converges it toward a grating or prism 90 which reassembles the beams of different frequencies into the beam 32. The optical length of the radiation path from grating 82 to mask 86 should be sufficiently long to provide a separation of the frequencies which permits their physical isolation for separate treatment. Such a length may be several meters. The filter of FIG. 4 is preferably enclosed in optical pipes or chambers to reduce dust collections on optical surfaces. The mask 86 may be absorptive and/or obliquely inclined to reduce feedback reflections.

The FIG. 4 system is preferably optically symmetrical on each side of the mask 86. Where only a single frequency of radiation is employed, the convergent and dispersive elements 88 and 90 are not needed.

In FIG. 5, an alternative form is shown having a prism 92 to separate the frequencies, a lens 94 to converge them to parallel beams, an inclined mask 96 to eliminate unwanted frequencies, a further lens 98 to reconverge the masked beams for reassembly by a prism 100 onto the beam 32. Prisms may be used in place of lenses 94 and 98. It is apparent that many variations of the optical systems shown in FIGS. 4 and 5 may be made, it being preferable, however, to limit the number of optical elements in the path of radiation.

In order to avoid feedback reflection of radiation along the path of beam 32 which would reinforce and augment the gain within a shorter length, it is desirable to orient all partially reflecting surfaces in the filters so as to avoid any reflection back along the path of beam 32.

The interval at which filters are placed in the column of excited particles will depend upon a number of conditions. Rather than predicting in advance from theory the interval at which they may be placed, an empirical determination for an operating system may prove to be the most efficient. In such a case where self lasing is encountered, the appropriate placement of the filter for most efficient use can be found by simply trying the filter at different points between the chambers 34a— until an interval is found at which the self lasing intensity is acceptably low. The theoretical considerations which go into the determination of a length for which the lasing amplification is insufficient to sustain harmful self lasing include the actual density of uranium vapor provided by the sources 44a . . . ; the degree of inversion at respective transitions illustrated in FIG. 1 along with other atomic parameters such as allowable transitions and Zeeman broadening which might limit the available self lasing transitions.

It is additionally desirable but not necessary to select specific frequencies for the energy steps such as transitions 12 and 14 which are sufficiently distinct in frequency from possible self lasing transitions to permit more convenient bandpass filtering of frequencies for those excitation transitions while at the same time attenuating frequencies of possible inversion transitions.

The system illustrated in FIG. 1 has been described as providing isotopically selective photoexcitation to an energy level 18. The level 18 has been broadly described above. For ionization from the level 18, any technique may be employed. The laser systems 30 may be constructed to include a third laser system of photon energy sufficient to ionize from the level 18. While the present invention has been described for limiting self lasing in excited particles, it is recognized that other forms of stimulated radiation such as stimulated Raman scattering may exist and be problematical. Filter means similar to the type described above may be employed to control stimulated radiation of this type.

Having described above a preferred embodiment according to the present invention, it will occur to those skilled in the art that alternatives and modifications to the disclosed system may be practiced within the spirit of the present invention. It is accordingly intended to limit the scope of the invention only as indicated in the following claims.

What is claimed is:
1. A system for limiting deexcitation losses by self lasing in a column of particles excited for subsequent further energization, said system comprising:
  means for defining said column of particles;
  means for applying radiation to said column of particles to produce excitation of particles in said column to at least one excited energy level;
  the column of said particles having at least one population inversion between an excited and lower level with a gain sufficient to produce self lasing of said column of particles; and
  means associated with said column of particles for reducing deexcitation thereof by self lasing.
2. The system of claim 1 wherein the reducing means includes a band elimination filter for reducing the gain at one or more particular frequencies where inversion gain is sufficient for producing intense self lasing in said column.
3. The system of claim 1 wherein the reducing means includes a bandpass filter having transmission at the one or more frequencies of said applied radiation.
4. The system of claim 1 wherein the reducing means includes a dispersive element.
5. The system of claim 4 wherein the dispersive element is a prism.
6. The system of claim 4 wherein the dispersive element is a grating.

7. The system of claim 1 wherein the reducing means includes:
a dispersive element operative to disperse the applied radiation across a spectrum;
means for occluding spectral portions in the dispersed radiation other than the frequencies corresponding to the applied radiation; and
means for applying the dispersed, selectively occluded radiation to further portions of the column of particles.

8. The system of claim 7 wherein the means for applying the dispersed, selectively occluded radiation includes a further dispersive element.

9. The system of claim 8 further including first and second converging elements intermediate the respective dispersive and further dispersive elements and the occluding means.

10. The system of claim 9 wherein the converging elements are cylindrical reflectors.

11. The system of claim 9 wherein the converging elements are refractive.

12. The system of claim 1 wherein the reducing means is of a type having partially reflecting surfaces and the partially reflecting surfaces are obliquely inclined to the path of applied radiation to prevent feedback reflection of self lasing radiation into portions of the column of particles.

13. The system of claim 1 wherein:
the means for defining a column of particles includes a plurality of atmospherically isolated chambers; and
the reducing means includes optically transmissive windows for the entry and exiting of the applied radiation from chamber to chamber;
the windows being obliquely inclined to the path of applied radiation to prevent feedback reflection to the chambers of self lasing radiation which would increase the gain thereof.

14. The system of claim 13 wherein said column of particles includes uranium vapor.

15. The system of claim 14 wherein the applied radiation is tuned for selective excitation of one uranium isotope type.

16. The system of claim 1 wherein said column of particles includes uranium vapor.

17. The system of claim 1 including a plurality of said reducing means.

18. The system of claim 1 wherein said reducing means includes an optical plate which has a transmission varying with frequency.

19. The system of claim 18 wherein said plate includes at least one coating.

20. A system for uranium enrichment comprising:
a plurality of chambers having:
means for generating a vapor containing uranium in plural isotope forms;
obliquely inclined radiation input and output windows between paths for radiation within said chambers;
a source of laser radiation of one or more frequencies with the radiation thereof applied sequentially to the radiation paths of said chambers through the windows thereof, the radiation thereby being applied to a column of uranium vapor to produce isotopically selective excitation of an isotope type in the uranium vapor;
means for separately collecting the excited isotope type;
a filter in the column of uranium vapor to which the radiation is applied and having:
dispersive elements which spread the radiation along spectral lines and recombine the radiation onto a single path; and
a mask obscuring the portions of the spectrum in the spread radiation other than the frequencies of the applied laser radiation;
the filter being positioned at a predetermined radiation path length from the laser radiation source in order to limit self lasing in the excited uranium vapor to an intensity which prevents the loss of a major portion of the laser excited particles in the uranium vapor.

21. A system for limiting deexcitation losses by stimulated radiation in a column of particles excited for subsequent further energization, said system comprising:
means for defining said column of particles;
means for applying energy to said column of particles to produce excitation of particles in said column to an excited energy state;
the column of said particles having a gain sufficient to produce stimulated radiation in said column of particles; and
means associated with said column of particles for inhibiting the stimulated radiation thereof.

22. The system of claim 21 wherein the inhibiting means includes a band elimination filter for reducing the gain at one or more particular frequencies of stimulated radiation.

23. The system of claim 21 wherein the inhibiting means includes a bandpass filter having transmission at the one or more frequencies of the applied energy.

24. The system of claim 21 further including means for extracting excited energy state particles from the column of particles.

25. The system of claim 21 wherein the particles include uranium particles.

26. The system of claim 25 wherein the stimulated radiation is stimulated Raman scattering.

27. The system of claim 25 wherein the stimulated radiation is self lasing.

28. In apparatus for isotope separation by isotopically selective ionization and separation in a column of particles, a system for limiting deexcitation losses by self lasing in excited particles of the column comprising:
means for defining said column of particles;
means for applying radiation to said column of particles to produce excitation of particles in said column to at least one excited energy level;
the column of said particles having at least one population inversion between an excited and lower level with a gain sufficient to produce self lasing of said column of particles; and
means associated with said column of particles for reducing deexcitation thereof by self lasing.

29. In apparatus for isotope separation having means for ionizing and separating particles of a selected isotope type, a system for limiting stimulated radiation in a column of the excited particles comprising:
means for defining said column of particles;
means for applying isotopically selective energy to said column of particles to produce excitation of particles in said column to an excited energy state for subsequent ionization thereof;
the column of said particles having a gain sufficient to produce stimulated radiation in said column of particles; and
means associated with said column of particles for inhibiting deexcitation thereof by the stimulated radiation.

* * * * *